United States Patent
Hirose et al.

(10) Patent No.: US 12,168,858 B2
(45) Date of Patent: Dec. 17, 2024

(54) BATTERY-OPERATED WORK MACHINE

(71) Applicant: Hitachi Construction Machinery Tierra Co., Ltd., Koka (JP)

(72) Inventors: Yuki Hirose, Rittou (JP); Masayuki Yunoue, Koka (JP); Tatsuo Takishita, Koka (JP); Wataru Takagi, Kusatsu (JP); Takuya Nomura, Rittou (JP)

(73) Assignee: Hitachi Construction Machinery Tierra Co., Ltd., Koka (JP)

( * ) Notice: Subject to any disclaimer, the term of this patent is extended or adjusted under 35 U.S.C. 154(b) by 753 days.

(21) Appl. No.: 17/276,747

(22) PCT Filed: Mar. 16, 2020

(86) PCT No.: PCT/JP2020/011559
§ 371 (c)(1),
(2) Date: Mar. 16, 2021

(87) PCT Pub. No.: WO2020/196062
PCT Pub. Date: Oct. 1, 2020

(65) Prior Publication Data
US 2022/0049467 A1    Feb. 17, 2022

(30) Foreign Application Priority Data
Mar. 26, 2019   (JP) ................ 2019-059413

(51) Int. Cl.
*E02F 9/22* (2006.01)
*B60L 15/20* (2006.01)
(Continued)

(52) U.S. Cl.
CPC ............ *E02F 9/2253* (2013.01); *B60L 15/20* (2013.01); *B60L 50/60* (2019.02); *B60L 58/12* (2019.02);
(Continued)

(58) Field of Classification Search
CPC ........... E02F 9/2253; E02F 3/325; E02F 9/26; B60L 50/60; B60L 58/12; B60L 15/20;
(Continued)

(56) References Cited

U.S. PATENT DOCUMENTS 5,022,482 A  *  6/1991  Andersson ............... B62D 5/09
                                                            180/406
9,127,438 B2 *  9/2015  Kawasaki ............. E02F 9/2282
(Continued)

FOREIGN PATENT DOCUMENTS

JP        11-107320 A     4/1999
JP       2003-111212 A    4/2003
(Continued)

OTHER PUBLICATIONS

International Preliminary Report on Patentability (PCT/IB/338 & PCT/IB/373) issued in PCT Application No. PCT/JP2020/011559 dated Oct. 7, 2021, including English translation of document C2 (Japanese-language Written Opinion (PCT/ISA/237) filed on Mar. 16, 2021) (six (6) pages).

(Continued)

*Primary Examiner* — Manglesh M Patel
(74) *Attorney, Agent, or Firm* — Crowell & Moring LLP (57) ABSTRACT

A battery-operated work machine is provided which can perform a work while avoiding such a situation that the work machine cannot reach charging equipment. When the remaining capacity of a battery becomes lower than a first threshold value set in advance, a controller controls an inverter such that the revolution speed of an electric motor is kept at a target revolution speed and controls a first notification device to operate, and besides switches a traveling motor to a travel first speed side, in which the displacement volume is a large volume, irrespective of an input from a traveling mode instruction device, when the (Continued)

remaining capacity of the battery becomes lower than a first threshold value set in advance.

6 Claims, 4 Drawing Sheets

(51) Int. Cl.
    *B60L 50/60*         (2019.01)
    *B60L 58/12*         (2019.01)
    *E02F 3/32*          (2006.01)
    *E02F 3/96*          (2006.01)
    *E02F 9/26*          (2006.01)
(52) U.S. Cl.
    CPC ..... *B60L 2200/40* (2013.01); *B60L 2240/421* (2013.01); *B60L 2250/10* (2013.01); *B60L 2250/16* (2013.01); *B60L 2260/20* (2013.01); *E02F 3/325* (2013.01); *E02F 3/964* (2013.01); *E02F 9/2285* (2013.01); *E02F 9/2292* (2013.01); *E02F 9/26* (2013.01)
(58) Field of Classification Search
    CPC .......... B60L 2260/20; B06L 2240/421; B06L 2250/10; B06L 2250/16
    USPC ...................................................... 701/22, 50
    See application file for complete search history.

(56) References Cited

U.S. PATENT DOCUMENTS

| | | | | |
|---|---|---|---|---|
| 9,376,103 | B2* | 6/2016 | Ueda | B60W 10/26 |
| 9,441,347 | B2* | 9/2016 | West | B60K 6/12 |
| 9,533,674 | B2* | 1/2017 | Miller | B60W 10/08 |
| 10,584,722 | B2* | 3/2020 | Hijikata | F15B 11/165 |
| 10,988,914 | B2* | 4/2021 | Yoshida | B60W 20/00 |
| 11,668,074 | B2* | 6/2023 | Ogawa | F15B 20/007 |
| | | | | 60/452 |
| 2009/0005939 | A1* | 1/2009 | Dueckinghaus | F16H 61/421 |
| | | | | 701/50 |
| 2012/0186889 | A1* | 7/2012 | Yoshida | E02F 9/0858 |
| | | | | 180/65.265 |
| 2013/0197766 | A1* | 8/2013 | Kurikuma | E02F 9/2246 |
| | | | | 701/50 |
| 2014/0046552 | A1* | 2/2014 | Tsuruga | E02F 9/2091 |
| | | | | 701/50 |
| 2014/0052350 | A1* | 2/2014 | Tsuruga | E02F 9/2296 |
| | | | | 701/50 |
| 2015/0218780 | A1* | 8/2015 | Hijikata | E02F 9/2228 |
| | | | | 701/50 |
| 2015/0225926 | A1* | 8/2015 | Hutchinson | E02F 9/2075 |
| | | | | 414/685 |
| 2016/0029542 | A1* | 2/2016 | Gschwendtner | A01B 63/10 |
| | | | | 701/50 |
| 2016/0029543 | A1* | 2/2016 | Stich | A01B 63/112 |
| | | | | 701/50 |
| 2016/0083932 | A1* | 3/2016 | Inoue | E02F 9/2091 |
| | | | | 701/22 |
| 2016/0097405 | A1* | 4/2016 | Hoshino | E02F 9/2296 |
| | | | | 60/428 |
| 2016/0138245 | A1* | 5/2016 | Moki | B60K 6/12 |
| | | | | 903/906 |
| 2017/0274755 | A1* | 9/2017 | Yoshida | E02F 9/2091 |
| 2017/0350327 | A1* | 12/2017 | Edamura | F02D 31/009 |
| 2017/0362799 | A1* | 12/2017 | Nakagawa | B60K 6/48 |
| 2018/0209524 | A1* | 7/2018 | Dodson | B60T 10/04 |
| 2018/0282968 | A1 | 10/2018 | Hita et al. | |
| 2019/0024342 | A1* | 1/2019 | Yoshida | B60W 20/17 |
| 2019/0115772 | A1* | 4/2019 | Takeda | H02J 7/00306 |
| 2020/0399856 | A1* | 12/2020 | Watanabe | H02J 7/00032 |
| 2021/0222399 | A1* | 7/2021 | Nomura | E02F 9/22 |
| 2022/0010527 | A1* | 1/2022 | Takeo | E02F 9/205 |
| 2022/0259821 | A1* | 8/2022 | Takahashi | F15B 15/18 |
| 2022/0282456 | A1* | 9/2022 | Watanabe | F02D 29/04 |
| 2022/0298750 | A1* | 9/2022 | Watanabe | H02P 4/00 |
| 2023/0061013 | A1* | 3/2023 | Kato | H02K 11/33 |
| 2023/0167623 | A1* | 6/2023 | Kitahara | E02F 9/207 |
| | | | | 60/325 |

FOREIGN PATENT DOCUMENTS

| | | | |
|---|---|---|---|
| JP | 2009-256988 A | 11/2009 | |
| JP | 2011-2085 A | 1/2011 | |
| JP | 2014-9564 A | 1/2014 | |
| KR | 10-2018-0030685 A | 3/2018 | |
| WO | WO-2017149939 A1 * | 9/2017 | ............... B60L 1/00 |

OTHER PUBLICATIONS

Korean-language Office Action issued in Korean Application No. 10-2021-7005215 dated Jul. 27, 2022 (four (4) pages).
International Search Report (PCT/ISA/210) issued in PCT Application No. PCT/JP2020/011559 dated Jun. 2, 2020 with English translation (five (5) pages).
Japanese-language Written Opinion (PCT/ISA/237) issued in PCT Application No. PCT/JP2020/011559 dated Jun. 2, 2020 (three (3) pages).

* cited by examiner

BATTERY-OPERATED WORK MACHINE

TECHNICAL FIELD

The present invention relates to a battery-operated work machine in which a hydraulic pump is driven by an electric motor to which electric power is supplied from a battery and an actuator is operated by delivery fluid from the hydraulic pump.

BACKGROUND ART

As a prior art document of a battery-operated work machine, for example, Patent Document 1 is available. Patent Document 1 discloses a hydraulic work machine that includes a battery, an electric motor driven by the battery, a hydraulic pump driven by the electric motor, and a plurality of actuators operated by the hydraulic pump. The hydraulic work machine is a battery-driven hydraulic work machine that includes battery remaining capacity detection means for detecting the remaining capacity of the battery, and operation limitation means for limiting operation of part or all of the actuators when the battery remaining capacity detected by the battery remaining capacity detection means reaches a battery set value set in advance, and the operation limitation means is configured such that it limits operation of the actuators by limiting electric power supply from the battery to the electric motor.

PRIOR ART DOCUMENT

Patent Document

Patent Document 1: JP-11-107320-A

SUMMARY OF THE INVENTION

Problem to be Solved by the Invention

In the battery-driven work machine disclosed in Patent Document 1, when the remaining capacity of the battery reaches the battery set value, the electric power supply from the battery to the electric motor is limited to limit operation of part or all of the actuators, to thereby secure electric power with which the work machine can move to charging equipment.

However, since the electric power necessary for the work machine to travel to charging equipment differs depending on the distance to the charging equipment, there is the possibility that, when the battery remaining capacity reaches the battery set value, the battery remaining capacity may have already been lower than the electric power with which the work machine can reach the charging equipment. Further, if the battery remaining capacity reaches the battery set value and the electric power supply from the battery to the electric motor is limited, then since also operation of an actuator that drives a work attachment (front work implement) is limited, when the work machine gets stuck in the mud, for example, the work machine cannot escape using the front work implement, resulting in the possibility that the work machine may not possibly reach the charging equipment.

The present invention has been made in view of the subject described above, and it is an object of the present invention to provide a battery-operated work machine that can perform a work while avoiding such a situation that the work machine cannot reach charging equipment.

Means for Solving the Problem

In order to achieve the object described above, according to the present invention, there is provided a battery-operated work machine including: a main body; a front work implement attached to the main body; a battery; an electric motor driven by electric power of the battery; an inverter that controls the electric motor; a target revolution speed instruction device that gives an instruction on a target revolution speed of the electric motor; a hydraulic pump driven by the electric motor; an actuator to which delivery fluid of the hydraulic pump is supplied to drive the front work implement; a traveling motor to which delivery fluid of the hydraulic pump is supplied to cause the main body to travel; a traveling mode instruction device that gives an instruction on a traveling mode of the main body; and a controller that controls the inverter such that a revolution speed of the electric motor coincides with the target revolution speed, and switches the traveling motor to a travel first speed side with which a displacement volume is a large volume when an instruction on the travel first speed is given by the traveling mode instruction device, and switches the traveling motor to a travel second speed side with which the displacement volume is a small volume when an instruction on the travel second speed is given by the traveling mode instruction device. The controller controls the inverter such that the revolution speed of the electric motor is kept at the target revolution speed and switches the traveling motor to the travel first speed side, irrespective of an input from the traveling mode instruction device, when the remaining capacity of the battery becomes lower than a first threshold value set in advance.

According to the present invention configured in such a manner as described above, the traveling motor is switched to the travel first speed side, irrespective of an input from the traveling mode instruction device, when the remaining capacity of the battery becomes lower than the first threshold value set in advance. Consequently, since the battery consumption by driving of the traveling motor is suppressed, the operator can reach charging equipment with certainty by promptly performing a traveling operation for travelling toward the charging equipment.

Then, even if the remaining capacity of the battery becomes lower than the first threshold value, since the revolution speed that drives the hydraulic pump is kept at the target revolution speed, driving of the actuator for driving the front work implement is not limited. Consequently, when the work machine gets stuck in the mud, for example, in a state in which the battery remaining capacity is lowered, the operator can achieve escapement using the front work implement.

Advantages of the Invention

With the battery-operated work machine according to the present invention, a work can be performed while such a situation that charging equipment cannot be reached is avoided.

MODES FOR CARRYING OUT THE INVENTION

First Embodiment

In the following, a battery-operated work machine according to an embodiment of the present invention is described with reference to the drawings taking a battery-operated hydraulic excavator as an example. It is to be noted that, in the figures, like elements are denoted by like reference characters and overlapping description thereof is suitably omitted.

Figure 1:
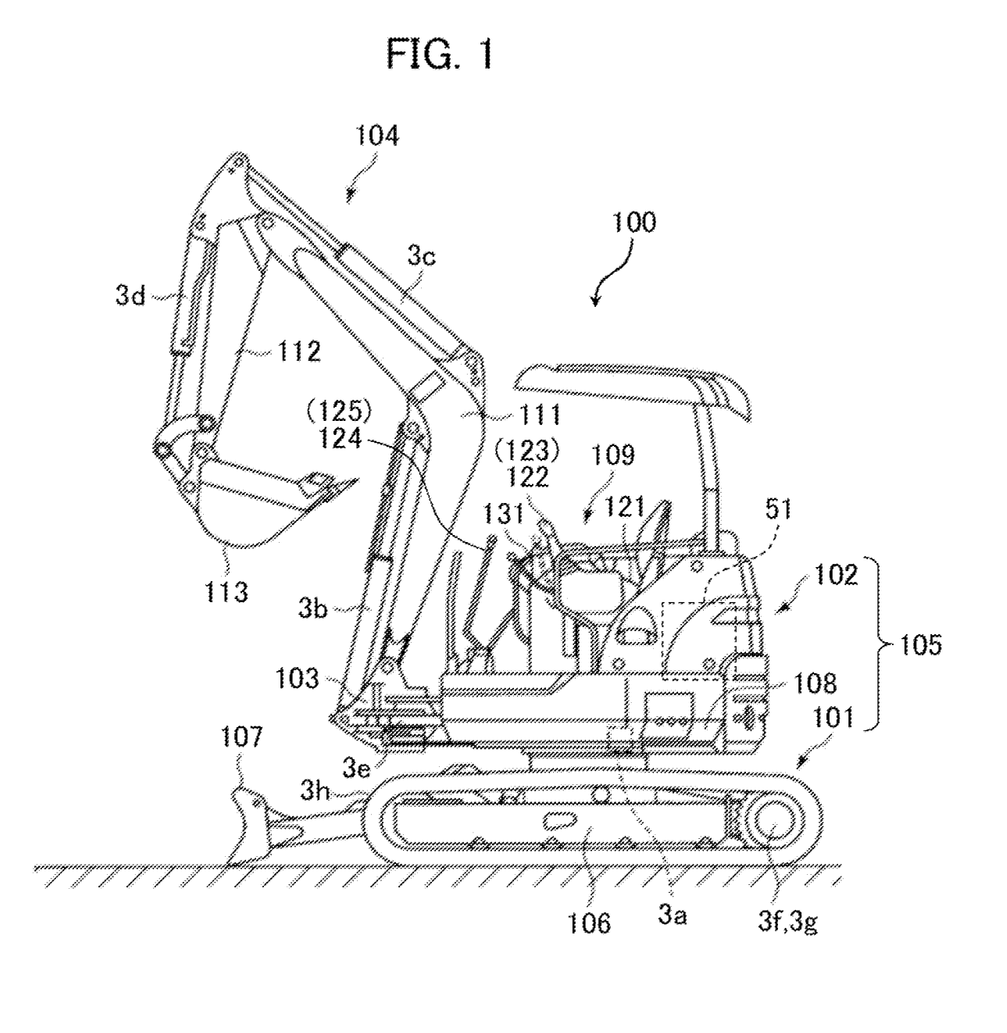
FIG. 1 is a view depicting an appearance of a hydraulic excavator according to an embodiment of the present invention.

FIG. 1 is a view depicting an appearance of the battery-operated hydraulic excavator (hereinafter referred to as hydraulic excavator) according to the present embodiment.

Referring to FIG. 1, the hydraulic excavator 100 includes a lower track structure 101, an upper swing structure 102 swingably mounted on the lower track structure 101, and a front work implement 104 rotatably connected in upward and downward directions and leftward and rightward directions to a distal end portion of the upper swing structure 102 through a swing post 103. The lower track structure 101 and the upper swing structure 102 configure a main body 105 of the hydraulic excavator 100. The lower track structure 101 is of the crawler type, and a blade 107 for earth removal that is upwardly and downwardly movable is provided on the front side of a truck frame 106. The upper swing structure 102 includes a swing structure 108 that forms a foundation lower structure, and an operating room 109 of the canopy type provided on the swing structure 108. The front work implement 104 includes a boom 111, an arm 112, and a bucket 113. The boom 111 is pin-coupled at a proximal end thereof to the swing post 103, and the boom 111 is pin-coupled at a distal end thereof to a proximal end of the arm 112 and the arm 112 is pin-coupled at a distal end thereof to the bucket 113.

The upper swing structure 102 is swingably driven with respect to the lower track structure 101 by a swing motor 3a. The boom 111, the arm 112, and the bucket 113 are pivoted by elongation and contraction of a boom cylinder 3b, an arm cylinder 3c and a bucket cylinder 3d, respectively. The swing post 103 is driven leftwardly and rightwardly by a swing cylinder 3e. The lower track structure 101 is driven by left and right traveling motors 3f and 3g. The blade 107 is driven upwardly and downwardly by a blade cylinder 3h.

An operator's seat 121, operation levers 122 and 123 (only a left side one is depicted), traveling operation levers 124 and 125 (only a left side one is depicted) and a gate lock lever 131 are provided in the operating room 109. A battery 51 is arranged in the rear of the operating room 109 on the swing structure 108.

Figure 2:
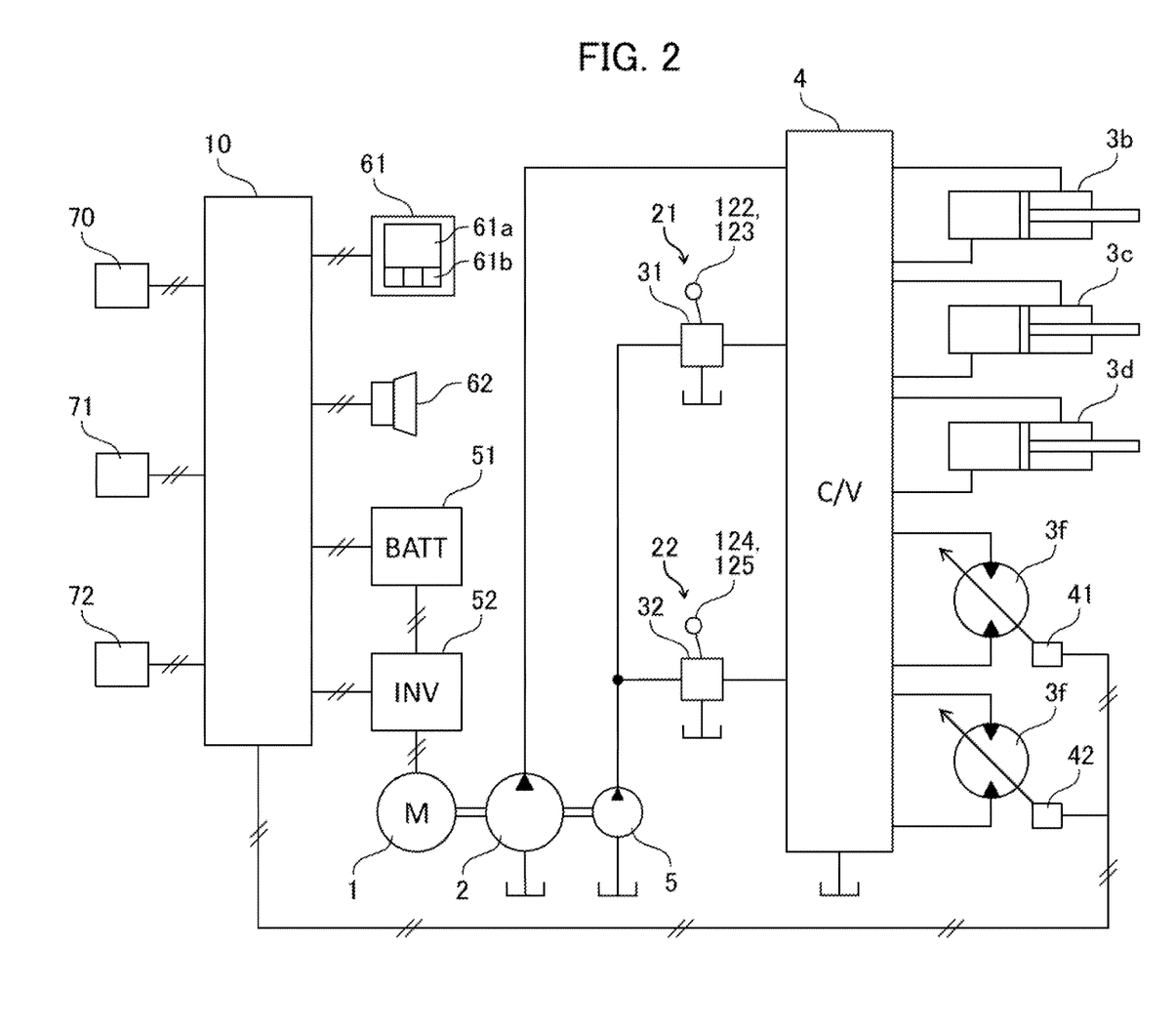
FIG. 2 is a view depicting a configuration of a hydraulic drive system incorporated in the hydraulic excavator depicted in FIG. 1.

FIG. 2 is a view depicting a configuration of the hydraulic drive system incorporated in the hydraulic excavator depicted in FIG. 1. It is to be noted that, in FIG. 2, illustration of elements relating to driving of the swing motor 3a, swing cylinder 3e, and blade cylinder 3h are omitted.

Referring to FIG. 2, the hydraulic drive system in the present embodiment includes an electric motor 1, a battery 51, an inverter 52, a hydraulic pump 2, a pilot pump 5, a control valve 4, an boom cylinder 3b, an arm cylinder 3c, a bucket cylinder 3d, traveling motors 3f and 3g, a work operation device 21, a traveling operation device 22, a controller 10, a monitor 61, a buzzer 62, a target revolution speed instruction device 70, a traveling mode switch 71, and a traveling limitation switch 72.

The traveling motors 3f and 3g are each configured from a variable displacement type hydraulic motor and tilting (displacement volume) thereof is adjusted by regulators 41 and 42, respectively. An operator switches the traveling mode switch 71 to a travel first speed side when low speed traveling is to be performed, and switches the traveling mode switch 71 to a travel second speed side when high speed traveling is to be performed. If an instruction on low speed travel (travel first speed) is given through the traveling mode switch 71, then the controller 10 controls the regulators 41 and 42 such that tilting of the traveling motors 3f and 3g is switched to a large volume (travel first speed side). On the other hand, if an instruction on high speed travel (travel second speed) is given through the traveling mode switch 71, then the controller controls the regulators 41 and 42 such that tilting of the traveling motors 3f and 3g is switched to a small volume (travel second speed side). Here, the power consumption of the traveling motors 3f and 3g is higher upon second speed travel (high speed travel) than upon first speed travel (low speed travel). This is because increase in revolution speed of the traveling motors 3f and 3g increases the pressure loss. Therefore, the battery consumption by driving of the traveling motors 3f and 3g is higher upon second speed travel (high speed travel) than upon first speed travel (low speed travel).

The hydraulic pump 2 and the pilot pump 5 are driven by the electric motor 1. The electric motor 1 is driven by electric power of the battery 51 supplied through the inverter 52. The inverter 52 is controlled by the controller 10 to perform voltage control of the battery 51. The battery 51 has a battery controller (not depicted) built therein and outputs information on the battery 51 (battery remaining capacity and so forth) to the controller 10.

The control valve 4 distributes hydraulic fluid delivered from the hydraulic pump 2 to the actuators 3b, 3c, 3d, 3f, and 3g. The direction and the flow rate of hydraulic fluid supplied from the hydraulic pump 2 to each actuator is controlled by a directional control valve (not depicted) provided corresponding to each of the actuators in the control valve 4.

The work operation device 21 is a device that gives instructions on operation of the boom cylinder 3b, the arm cylinder 3c, and the bucket cylinder 3d and includes the operation levers 122 and 123 operated by the operator and a pilot valve 31 operated through the operation levers 122 and 123. The pilot valve 31 reduces the delivery pressure (pilot primary pressure) of the pilot pump 5 according to an operation amount of the operation levers 122 and 123 to generate pilot pressure for switching the directional control valves corresponding to the actuators 3b, 3c, and 3d and outputs the pilot pressure to the control valve 4.

The traveling operation device 22 is a device for giving instructions on operation of the traveling motors 3f and 3g and includes the traveling operation levers 124 and 125 operated by the operator and a pilot valve 32 operated through the traveling operation levers 124 and 125. The pilot valve 32 reduces the delivery pressure (pilot primary pressure) of the pilot pump 5 according to an operation amount of the traveling operation levers 124 and 125 to generate pilot pressure for switching the directional control valves corresponding to the traveling motors 3f and 3g and outputs the pilot pressure to the control valve 4.

The monitor 61 is configured from a touch panel and includes a display section 61a and an operation section 61b. The display section 61a displays various kinds of information output from the controller 10. Further, the operator can input various kinds of information to the controller 10 through operation of the operation section 61b. The buzzer 62 emits alarm sound according to a control signal from the controller 10. The target revolution speed instruction device 70 is operated by the operator to instruct the controller 10 on a target revolution speed of the electric motor 1. The traveling mode switch 71 is operated by the operator to instruct the controller 10 on a traveling mode of the main body 105. The traveling limitation switch 72 is operated by the operator to instruct the controller 10 that a function for limiting the traveling mode to the travel first speed is valid or invalid according to the remaining capacity of the battery 51. It is to be noted that, although, in the description of the present embodiment, it is described that the target revolution speed instruction device 70, the traveling mode switch 71, and the traveling limitation switch 72 are devices independent of each other, the present invention is not restricted to this, and they may be configured otherwise from the operation section 61b of the monitor 61.

The controller 10 controls the inverter 52 according to an input from the target revolution speed instruction device 70 and the battery remaining capacity. Further, the controller 10 outputs a control signal for switching the tilting (displacement volume) of the traveling motors 3f and 3g to the small volume (travel first speed side) or the large volume (travel second speed side) to the regulators 41 and 42 according to inputs from the traveling mode switch 71 and the traveling limitation switch 72 and the battery remaining capacity.

Figure 3:
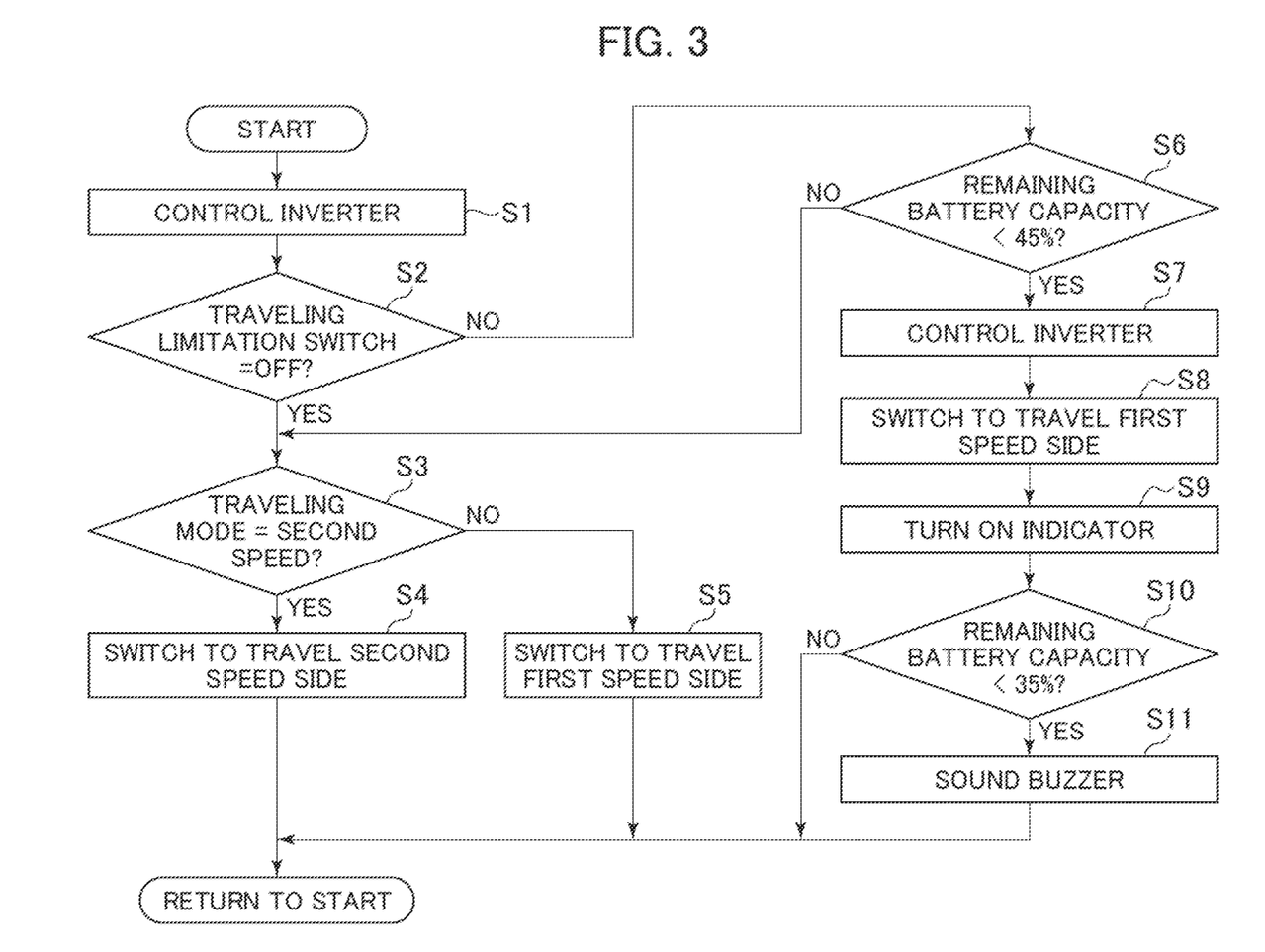
FIG. 3 is a flow chart depicting processing of a controller depicted in FIG. 2.

FIG. 3 is a flow chart depicting processing by the controller 10. In the following, individual steps are described in order.

The controller 10 controls the inverter 52 according to an input from the target revolution speed instruction device 70. Specifically, the controller 10 controls the inverter 52 such that the revolution speed of the electric motor 1 coincides with a target revolution speed based on the instruction given by the target revolution speed instruction device 70.

Next to step S51, the controller 10 decides whether or not the traveling limitation switch 72 is OFF (step S2).

If it is decided at step S2 that the traveling limitation switch 72 is OFF (YES), then the controller 10 decides whether or not the traveling mode input through the traveling mode switch 71 is the second speed (step S3).

If it is decided at step S3 that the traveling mode is the second speed (YES), then the controller 10 switches the traveling motors 3f and 3g to the travel second speed side (step S4).

If it is decided at step S3 that the traveling mode is not the second speed, namely, that the traveling mode is the first speed (NO), then the controller 10 switches the traveling motors 3f and 3g to the travel first speed side (step S5).

Figure 4:
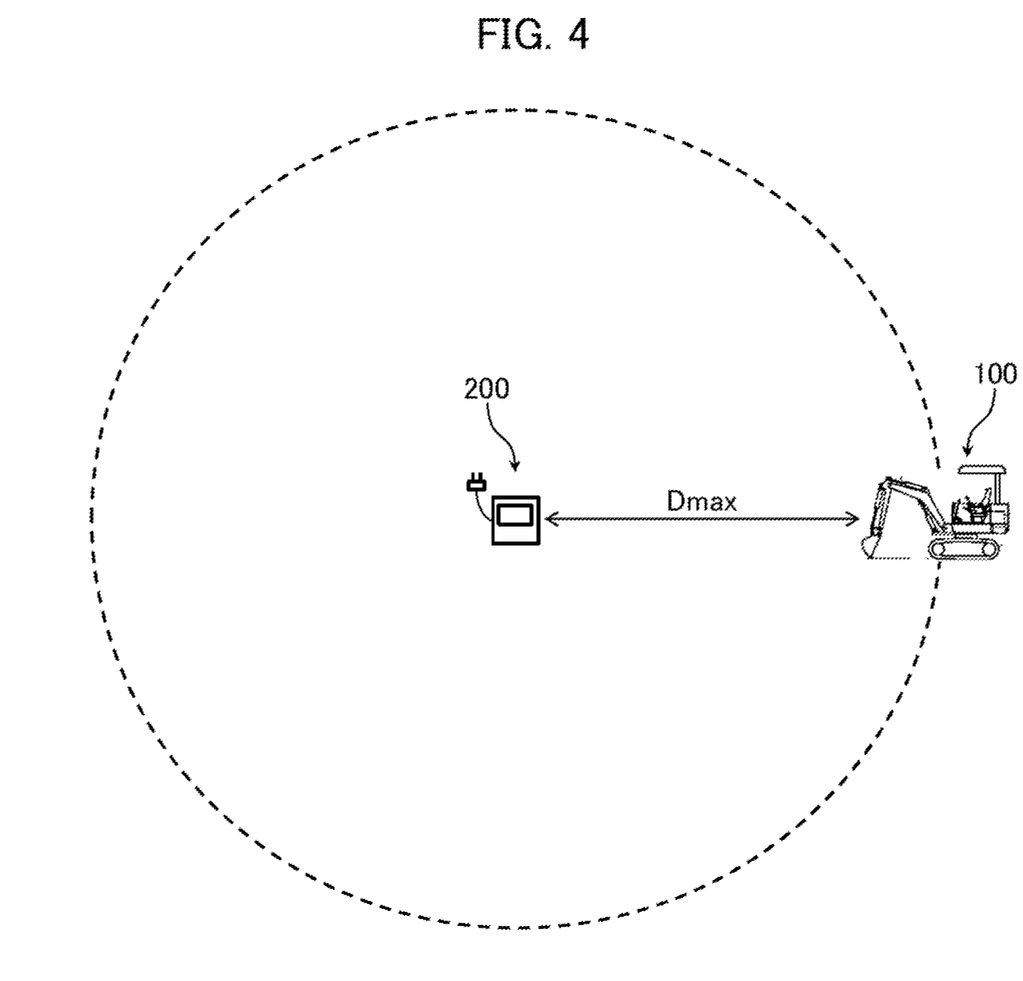
FIG. 4 is a view depicting a work environment of the hydraulic excavator depicted in FIG. 1.

If it is decided at step S2 that the traveling limitation switch 72 is ON (NO), then the controller 10 decides whether or not the battery remaining capacity is lower than a first threshold value (step S6). Here, a determination method for the first threshold value is described with reference to FIG. 4. FIG. 4 is a view depicting a work environment of the hydraulic excavator 100. Referring to FIG. 4, a distance Dmax represents a maximum distance from charging equipment 200 to a work site. The first threshold value is set to a value equal to or higher than a minimum battery remaining capacity required for traveling over the distance Dmax at the second speed (for example, to 45% of that in a fully charged state). It is to be noted that, since the distance Dmax differs depending on the work environment, it is necessary to change also the first threshold value according to the work environment. Accordingly, it is desirable to configure the operation section 61b of the monitor 61 such that the operator can input a distance Dmax and configure the controller 10 such that it calculates the first threshold value and a second threshold value, hereinafter described, according to the distance Dmax input through the operation section 61b.

Referring back to FIG. 3, if it is decided at step S6 that the battery remaining capacity is lower than the first threshold value, then the controller 10 controls the inverter 52 according to an input from the target revolution speed instruction device 70 and the battery remaining capacity (step S7). Specifically, the controller 10 controls the inverter 52 such that the revolution speed of the electric motor 1 is kept at the target revolution speed in the state in which the battery remaining capacity is lower than the first threshold value.

Subsequently to step S7, the controller 10 switches the traveling motors 3f and 3g to the travel first speed side (step S8). Consequently, when reaching the charging equipment by traveling at the travel second speed may be impossible, the tilting of the traveling motors 3f and 3g is limited to the travel first speed irrespective of an input from the traveling mode switch 71. Consequently, the battery consumption by driving of the traveling motors 3f and 3g can be suppressed.

Subsequently to step S8, the controller 10 turns on an indicator to be displayed on the display section 61a of the monitor 61 (step S9). If the operator confirms the turning on of the indicator and then promptly performs a traveling operation for travelling toward the charging equipment 200, then reaching the charging equipment 200 with certainty is possible. It is to be noted that, although the indicator in the present embodiment is configured from the display section 61a of the monitor 61, the present invention is not limited to this, and the indicator may otherwise be configured from a device independent of the monitor 61.

Subsequently to step S9, the controller 10 decides whether or not the battery remaining capacity is lower than a second threshold value (step S10). Here, the second threshold value is set to a value that is lower than the first threshold value (45%) and besides is equal to or higher than a minimum battery remaining capacity necessary for the hydraulic excavator 100 to travel over the distance Dmax (refer to FIG. 4) at the travel first speed (for example, to 35% of that in a fully charged state).

If it is decided at step S10 that the battery remaining capacity is lower than the second threshold value (YES), then the controller 10 sounds the buzzer 62 (step S11) and then returns the processing to the start. Consequently, the operator can recognize that it is necessary to charge the battery 51 as soon as possible.

If it is decided at step S10 that the battery remaining capacity is equal to or higher than the second threshold value (NO), then the processing returns to the start.

In the present working example, in a battery-operated work machine 100 including: a main body 105; a front work implement 104 attached to the main body 105; a battery 51; an electric motor 1 driven by electric power of the battery 51; an inverter 52 that controls the electric motor 1; a target revolution speed instruction device 70 that gives an instruction on a target revolution speed of the electric motor 1; a hydraulic pump 2 driven by the electric motor 1; an actuator 3b, 3c, 3d to which delivery fluid of the hydraulic pump 2 is supplied to drive the front work implement 104; a traveling motor 3f, 3g to which delivery fluid of the hydraulic pump 2 is supplied to cause the main body 105 to travel; a traveling mode instruction device 71 that gives an instruction on a traveling mode of the main body 105; and a controller 10 that controls the inverter 52 such that the revolution speed of the electric motor 1 coincides with the target revolution speed, and switches the traveling motor 3f, 3g to the travel first speed side with which the displacement volume is a large volume when an instruction on a travel first speed is given by the traveling mode instruction device 71, and switches the traveling motor 3f, 3g to the travel second speed side with which the displacement volume is a small volume when an instruction on a travel second speed is given by the traveling mode instruction device 71, the controller 10 controls the inverter 52 such that the revolution speed of the electric motor 1 is kept at the target revolution speed and switches the traveling motor 3f, 3g to the travel first speed side, irrespective of an input from the traveling mode instruction device 71, when the remaining capacity of the battery 51 becomes lower than a first threshold value (45%) set in advance.

Further, the first threshold value is set on the basis of a battery remaining capacity necessary for the main body 105 to travel over a predetermined distance at the travel second speed.

According to the present working example configured as described above, when the remaining capacity of the battery 51 becomes lower than the first threshold value (45%) set in advance, the traveling motors 3f and 3g are switched to the travel first speed side, irrespective of an input from the traveling mode switch 71. Since this suppresses battery consumption due to driving of the traveling motors 3f and 3g, the operator can reach the charging equipment 200 with certainty by promptly performing a traveling operation for traveling toward the charging equipment 200.

Then, even if the battery remaining capacity becomes lower than the first threshold value (45%), since the revolution speed of the electric motor 1 that drives the hydraulic pump 2 is kept at the target revolution speed, driving of the actuators 3b, 3c, and 3d that drive the front work implement 104 is not limited. Consequently, when the main body 105 gets stuck in the mud in a state in which the battery remaining capacity is lowered, the operator can achieve escapement using the front work implement 104.

Further, the hydraulic excavator 100 according to the present working example further includes a traveling limitation instruction device 72, and the controller 10 switches the traveling motor 3f, 3g to the travel first speed side, irrespective of an input from the traveling mode instruction device 71, when the remaining capacity of the battery 51 becomes lower than the first threshold value (45%), only when the controller 10 is instructed that traveling limitation is required through the traveling limitation instruction device 72. By this, the operator can switch the function of limiting the traveling motors 3f and 3g to the travel first side between valid and invalid through operation of the traveling limitation switch 72. It is to be noted that, although, in the present embodiment, the first notification device is configured from the display section 61a of the monitor 61, it may otherwise be configured from a device that uses sound for notification.

Further, the battery-operated work machine 100 according to the present working example further includes a first notification device 14 that operates according to a control signal from the controller 9, and the controller 9 controls the first notification device to operate when the remaining capacity of the battery 51 becomes smaller than the first threshold value. By this, the operator can recognize that the remaining capacity of the battery 51 becomes lower than the first threshold value.

Further, the battery-operated work machine 100 according to the present working example further includes a second notification device 62, and the controller 10 controls the second notification device 62 to operate when the remaining capacity of the battery 51 becomes lower than a second threshold value (35%) that is lower than the first threshold value (45%), the second threshold value being set on the basis of a battery capacity necessary for the main body 105 to travel over the predetermined distance Dmacx at the travel first speed. Consequently, the operator can recognize that it is necessary to charge the battery 51 as soon as possible. It is to be noted that, although the second notification apparatus in the present embodiment is configured from the buzzer 62, it may otherwise be configured from a device that uses means other than sound for notification.

Further, the battery-operated work machine 100 according to the present working example further includes a distance input device 61b for inputting the predetermined distance Dmax to the controller 10, and the controller 10 calculates the first threshold value according to the predetermined distance Dmax inputted from the distance input device 61b. Consequently, the operator can change the first threshold value according to the maximum distance Dmax to the charging equipment 200. It is to be noted that, although the distance input device in the present embodiment is configured from the operation section 61b, it may otherwise be configured from a device independent of the monitor 61.

Although the embodiment of the present invention has been described in detail above, the present invention is not restricted to the embodiment described above but includes various modifications. For example, although, in the embodiment described above, the present invention is applied to a battery-operated hydraulic excavator, the present invention can be applied also to other battery-operated work machines. Further, the embodiment described above has been described in detail in order to explain the present invention in an easy-to-understand manner and are not necessarily limited to what includes all configurations described above.

DESCRIPTION OF REFERENCE CHARACTERS

1: Electric motor
2: Hydraulic pump
3a: Swing motor
3b: Boom cylinder (actuator)
3c: Arm cylinder (actuator)
3d: Bucket cylinder (actuator)
3e: Swing cylinder
3f, 3g: Traveling motor (actuator)
3h: Blade cylinder
4: Control valve
5: Pilot pump
10: Controller
21: Work operation device
22: Traveling operation device
31, 32: Pilot valve
41, 42: Regulator
51: Battery
52: Inverter
61: Monitor
61a: Display section (first notification device)
61b: Operation section (distance input device)

62: Buzzer (second notification device)
70: Target revolution speed instruction device
71: Traveling mode switch (traveling mode instruction device)
72: Traveling limitation switch (traveling limitation instruction device)
101: Lower track structure
102: Upper swing structure
103: Swing post
104: Front work implement
105: Main body
106: Truck frame
107: Blade
108: Swing structure
109: Operating room
111: Boom
112: Arm
113: Bucket
121: Operator's seat
122, 123: Work operation lever
124, 125: Traveling operation lever
131: Gate lock lever
200: Charging equipment

The invention claimed is:

1. A battery-operated work machine comprising:
a main body;
a front work implement attached to the main body;
a battery;
an electric motor driven by electric power of the battery;
an inverter that controls the electric motor;
a target revolution speed instruction device that gives an instruction on a target revolution speed of the electric motor;
a hydraulic pump driven by the electric motor;
an actuator to which delivery fluid of the hydraulic pump is supplied to drive the front work implement;
a traveling motor that is configured from a variable displacement type hydraulic motor to which delivery fluid of the hydraulic pump is supplied to cause the main body to travel;
a traveling mode instruction device that gives an instruction on a traveling mode of the main body, the traveling mode being either a travel first speed in which the main body travels at a low speed or a travel second speed in which a battery consumption by driving of the traveling motor is higher than the first speed travel and the main body travels at a high speed; and
a controller that is configured to control the inverter such that a revolution speed of the electric motor coincides with the target revolution speed, and switches the traveling motor to a travel first speed side with which a displacement volume is a large volume in a case where an instruction on the travel first speed is given by the traveling mode instruction device, and switches the traveling motor to a travel second speed side with which the displacement volume is a small volume in a case where an instruction on the travel second speed is given by the traveling mode instruction device, wherein
the controller is configured to control the inverter such that the revolution speed of the electric motor is kept at the target revolution speed thereby keeping the hydraulic pump driven, and switch the traveling motor to the travel first speed side thereby making the displacement volume of the traveling motor large, irrespective of an input from the traveling mode instruction device, in a case where a remaining capacity of the battery becomes lower than a first threshold value set in advance.

2. The battery-operated work machine according to claim 1, wherein
the first threshold value is set on a basis of a battery remaining capacity necessary for the main body to travel over a predetermined distance at the travel second speed.

3. The battery-operated work machine according to claim 2, further comprising:
a traveling limitation instruction device, wherein
the controller is configured to limit the traveling of the main body by switching the traveling motor to the travel first speed side thereby making the displacement volume of the traveling motor large, irrespective of an input from the traveling mode instruction device, in a case where the remaining capacity of the battery becomes lower than the first threshold value, only in a case where the controller is instructed that traveling limitation is required through the traveling limitation instruction device.

4. The battery-operated work machine according to claim 2, further comprising:
a first notification device that operates according to a control signal from the controller, wherein
the controller is configured to control the first notification device to operate in a case where the remaining capacity of the battery becomes smaller than the first threshold value.

5. The battery-operated work machine according to claim 4, further comprising:
a second notification device, wherein
the controller is configured to control the second notification device to operate in a case where the remaining capacity of the battery becomes lower than a second threshold value that is lower than the first threshold value, the second threshold value being set on a basis of a battery capacity necessary for the main body to travel over the predetermined distance at the travel first speed.

6. The battery-operated work machine according to claim 2, further comprising:
a distance input device for inputting the predetermined distance to the controller, wherein
the controller is configured to calculate the first threshold value according to the predetermined distance inputted from the distance input device.

* * * * *